Oct. 26, 1943.  L. P. G. VAUTIER  2,332,955
METHOD AND APPARATUS FOR MAKING ARTIFICIAL SPONGES
Filed Dec. 30, 1939
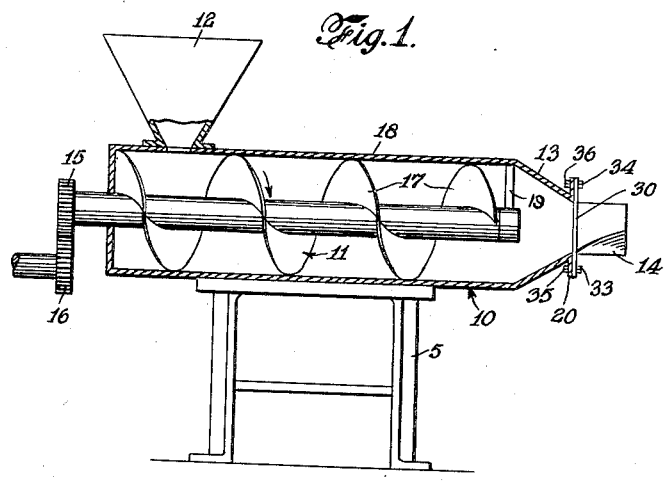
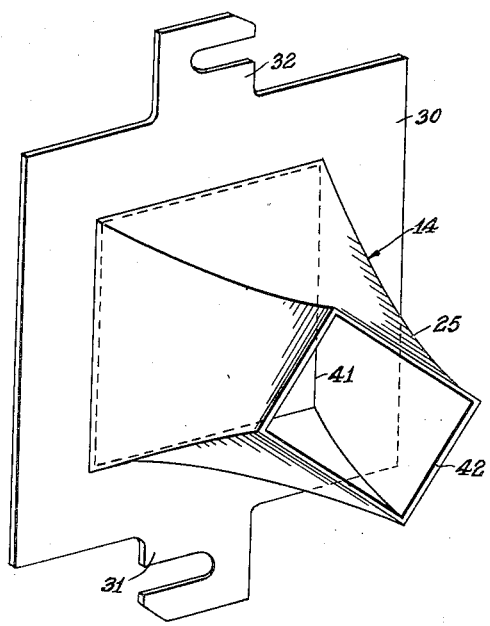
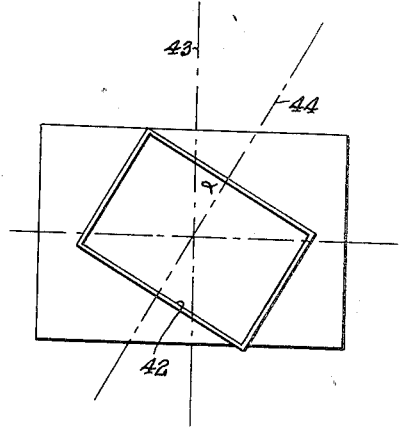
INVENTOR.
LEON PIERRE GEORGES VAUTIER
BY
ATTORNEY.

Patented Oct. 26, 1943

2,332,955

UNITED STATES PATENT OFFICE 2,332,955

METHOD AND APPARATUS FOR MAKING ARTIFICIAL SPONGES

Leon Pierre Georges Vautier, St. Just des Marais, Oise, France; vested in the Alien Property Custodian Application December 30, 1939, Serial No. 311,909
In France February 6, 1939

8 Claims. (Cl. 18—12)

This invention relates to artificial sponges, and more particularly to an apparatus for molding the sponge-forming composition.

In the manufacture of artificial sponges a plastic mass comprising a cellulose solution, such as viscose, intimately mixed with fibrous material and pore-forming substances, such as soluble or fusible crystalline materials, is appropriately molded. Depending on the process of molding, the composition may be coagulated either in the mold or after molding. After coagulation, the molded materials are washed and suitably treated.

United States Patent No. 2,116,611 discloses a continuous process of molding the sponge-forming cellulose composition by means of piston presses in which the nozzle of the extrusion press is provided with a nose in the shape of a truncated cone to provide a certain constriction of the extruded material, which may be either a roll (circular in cross-section) or a bar (rectangular in cross-section).

When an extrusion press having a conveying screw was employed, it was found that the bar or roll extruded therefrom exhibited internal stresses. This was probably due to the work of the screw. The aforesaid Patent No. 2,116,611 discloses a procedure to more or less reduce the internal stresses by subjecting sections cut from the extruded material to certain deformations. Even though the process described in said United States Patent No. 2,116,611 constitutes a considerable advance in the art, still all the internal stresses are not completely removed or eliminated.

The internal stresses tend to cause changes in dimension of the product. These are of no serious consequence in the spherical or like-shaped sponges with which the aforesaid patent is primarily concerned, but are undesirable in the case of parallelepipedonal sponges produced from large blocks.

An object of this invention is to provide artificial sponges which are practically free from internal tensions or stresses.

Another object of this invention is to provide a method of producing artificial sponges which are substantially free from internal stresses and tensions.

An additional object of this invention is to provide an apparatus for producing artificial sponges substantially free from internal stresses.

Additional objects will appear from the following description, appended claims and accompanying drawing forming a part of this specification and wherein:

Figure 1 is a vertical section of an extrusion apparatus embodying the principles of this invention;

Figure 2 is a perspective view of the nose of the extrusion press shown in Figure 1; and Figure 3 is a diagrammatic view showing the relationship of the nose of the nozzle to the plate which carries it.

The above objects of the invention are in general achieved by providing the nozzle of the extruding press with a pyramidal nose twisted in the direction opposite to the direction of rotation of the conveying screw of the press. Usually, it is sufficient to give the nose described in United States Patent No. 2,116,611 a twist of 15–45°, but a greater or lesser twist may be useful in certain cases, depending on the speed of rotation of the screw, the consistency of the cellulose composition, etc.

Experience has shown that the employment of a twisted nose, as previously described, causes roll or bar deformations which produce the disorientation described in the aforesaid United States Patent No. 2,116,611.

The expression "twisted pyramidal nose" used in this specification is not to be construed in the strict mathematical sense. This expression is intended to define a tubular body in which the apertures at the opposite ends thereof are polygonal in shape, the sides of the aperture at the front thereof being smaller than those of the aperture at the base, and the aperture at the front also having been rotated or twisted, for example 15–45°, with respect to the base. The ridges joining the angles of the respective apertures may be straight or curved and in the latter case with or without diminution of the angle with respect to the axis.

Referring now to the drawing wherein like reference characters designate like parts, the reference numeral 5 generally designates a support on which is mounted an extrusion press 10 provided with a screw conveyor 11 which conveys the plastic sponge-forming composition, introduced through the inlet 12, and causes the same to be extruded through the nozzle 13 and the nose 14.

The screw conveyor 11 is rotatably mounted in the press in any well known manner. In the form shown, one end of the screw conveyor 11 is provided with a gear 15 which is driven by a gear 16, the latter being appropriately connected to any suitable driving source (not shown). If desired, the opposite end of the screw conveyor 11 may be rotatably supported in a bracket or spider 19.

The vanes 17 constituting the conveyor elements of the screw conveyor 11 and the rate of rotation thereof, as well as the body member 18, the nozzle 13 and the nose 14, are so designed and of such dimensions as to exert sufficient pressure on the composition to produce an extruded product of the desired texture.

The body member 18 is provided with the nozzle 13 which may be made integral therewith or removably secured thereto and, as shown in the drawing, the nose 14 is secured to a flange 20 carried by the nozzle 13.

In the form illustrated, the nose 14 comprises a pyramidal nose 25, hereafter more fully described, carried on a base plate 30 provided with slotted ears 31 and 32 which are designed to cooperate with bolts 33 and 34 carried by the flange 20 and nuts 35 and 36, respectively, whereby the plate 30 will be secured in position on the flange. Obviously, the invention is not restricted to the precise details of mounting the nose on the nozzle, since it will be apparent to a person skilled in the art that many other modes of mounting the nose on the nozzle may be used.

The nose 25 is tubular and is provided at the base thereof with a rectangular (polygonal) aperture 41 which coincides with a base opening in the base plate 30. At the front or outlet end, the nose is also provided with a polygonal aperture 42. It is to be noted that the sides constituting the base aperture 41 are of smaller dimensions than the sides of the front aperture 42, and that the sides of the latter are not parallel to the sides of the former, but angularly disposed relative thereto. In other words, the vertical axes designated by the reference characters 43 and 44 of the base aperture 41 and the front aperture 42 are angularly disposed relative to each other. In the form shown in Figure 3, this angular disposition is designated by the reference character α, which in this case is approximately 30°. The nose 25 is provided with four side walls, each side wall terminating at one end thereof on one side of the base aperture and the opposite end terminating at one side of the front aperture, as shown in Figure 2.

From the preceding description it will become apparent that the nose 25 is formed of a truncated, four-sided, tubular pyramid in which the front or outlet aperture has been twisted to an angle of about 30° with respect to the base thereof.

It should be noted that the direction of twist of the front aperture is in a direction opposite to the direction of rotation of the screw conveyor 11.

Though the apparatus has been described in connection with a twisted, truncated, pyramidal nose, the invention is not restricted thereto since it is apparent that the principles thereof are equally applicable to twisted noses of other geometrical shapes, such as truncated cones, cylinders, etc.

The apparatus is not restricted to the use thereof with any particular composition. It may be utilized with any of the known compositions for producing artificial sponges, an illustrative example of which is set forth in United States Patent No. 2,116,611. After the sponge-forming composition has been extruded, it is cut into portions of appropriate size and the severed portions subjected to the usual steps of coagulation, washing, and other known steps necessary to produce the sponges. If desired, the extruded mass may be coagulated, washed, etc. prior to the severing thereof into the sections constituting the final sponges.

The product produced by the apparatus herein described produces directly a normally straight molded bar of sponge-forming composition which is substantially free of internal stresses and strains, an object long sought for in the art.

Since it is obvious that various changes and modifications may be made in the above description without departing from the nature or spirit thereof, this invention is not restricted thereto except as set forth in the appended claims.

I claim:

1. An apparatus for molding artificial sponge-forming compositions comprising a rotating screw conveyor and means to release the internal stresses and strains produced in the sponge-forming composition by the screw conveyor and thereby produce a normally straight molded bar substantially free of internal stresses and strains, said means comprising a hollow nose through which the composition is extruded by said screw conveyor, the front end of said nose being rectangular in cross-section and twisted about its longitudinal axis in a direction opposite to the direction of the rotation of said screw conveyor.

2. An apparatus for molding artificial sponge-forming compositions comprising a rotating screw conveyor and means to release the internal stresses and strains produced in the sponge-forming composition by the screw conveyor and thereby produce a normally straight molded bar substantially free of internal stresses and strains, said means comprising a hollow nose through which the composition is extruded by said screw conveyor, the front end of said nose being rectangular in cross-section and twisted from about 15° to about 45° about its longitudinal axis with respect to the base of said nose and in a direction opposite to the direction of the rotation of said screw conveyor.

3. An apparatus for molding artificial sponge-forming compositions comprising a rotating screw conveyor and means to release the internal stresses and strains produced in the sponge-forming composition by the screw conveyor and thereby produce a normally straight molded bar substantially free of internal stresses and strains, said means comprising a hollow nose through which the composition is extruded by said screw conveyor, the front end of said nose being rectangular in cross-section and twisted to about 30° about its longitudinal axis with respect to the base of said nose and in a direction opposite to the direction of the rotation of said screw conveyor.

4. An apparatus for molding artificial sponge-forming compositions comprising a rotating screw conveyor and means to release the internal stresses and strains produced in the sponge-forming composition by the screw conveyor and thereby produce a normally straight molded bar substantially free of internal stresses and strains, said means comprising a hollow, truncated, pyramidal nose through which the composition is extruded by said screw conveyor, the front end of said nose being rectangular in cross-section and twisted about its longitudinal axis in a direction opposite to the direction of the rotation of said screw conveyor.

5. An apparatus for molding artificial sponge-forming compositions comprising a rotating screw conveyor and means to release the internal stresses and strains produced in the sponge-forming composition by the screw conveyor and thereby produce a normally straight molded bar substantially free of internal stresses and strains, said means comprising a hollow, truncated, pyramidal nose through which the composition is extruded by said screw conveyor, the front end of said nose being rectangular in cross-section and twisted from about 15° to about 45° about its longitudinal axis with respect to the base of said nose and in a direction opposite to the direction of the rotation of said screw conveyor.

6. An apparatus for molding artificial sponge-forming compositions comprising a rotating screw conveyor and means to release the internal stresses and strains produced in the sponge-forming composition by the screw conveyor and thereby produce a normally straight molded bar substantially free of internal stresses and strains, said means comprising a hollow, truncated, pyramidal nose through which the composition is extruded by said screw conveyor, the front end of said nose being rectangular in cross-section and twisted to about 30° about its longitudinal axis with respect to the base of said nose and in a direction opposite to the direction of the rotation of said screw conveyor.

7. In a method of preparing artificial sponges wherein the sponge-forming composition is conveyed by a rotating screw conveyor through an extrusion device provided with a nozzle, the step of twisting the composition about its longitudinal axis and in a direction opposite to the direction of rotation of said screw conveyor as it passes through said nozzle to produce a normally straight molded bar of sponge-forming composition substantially free of internal stresses and strains.

8. In a method of preparing artificial sponges wherein the sponge-forming composition is conveyed by a rotating screw conveyor through an extrusion device provided with a nozzle, the step of twisting the composition from 15° to 45° about its longitudinal axis and in a direction opposite to the direction of rotation of said screw conveyor as it passes through said nozzle to produce a normally straight molded bar of sponge-forming composition substantially free of internal stresses and strains.

LEON PIERRE GEORGES VAUTIER.